United States Patent
Lu

(10) Patent No.: US 8,472,524 B2
(45) Date of Patent: Jun. 25, 2013

(54) MOTION COMPENSATED FRAME RATE CONVERSION WITH PROTECTION AGAINST COMPENSATION ARTIFACTS

(75) Inventor: Tiehan Lu, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 1632 days.

(21) Appl. No.: 11/397,041

(22) Filed: Apr. 3, 2006

(65) Prior Publication Data

US 2007/0229703 A1    Oct. 4, 2007

(51) Int. Cl.
*H04N 7/12* (2006.01)

(52) U.S. Cl.
USPC ................................ 375/240.16; 375/240.12

(58) Field of Classification Search
USPC .................. 375/240, 240.01, 240.12, 240.16, 375/240.11, 240.26; 382/233; 348/699, 452
See application file for complete search history.

(56) References Cited

U.S. PATENT DOCUMENTS

| | | | |
|---|---|---|---|
| 5,181,111 A | | 1/1993 | Hedley et al. |
| 5,493,338 A | | 2/1996 | Hong |
| 5,546,130 A | | 8/1996 | Hackett et al. |
| 5,784,494 A | * | 7/1998 | Strongin et al. ............. 382/233 |
| 6,192,079 B1 | * | 2/2001 | Sharma et al. ........... 375/240.16 |
| 6,594,313 B1 | | 7/2003 | Hazva et al. |
| 6,693,960 B2 | * | 2/2004 | Ito et al. .................... 375/240.11 |
| 6,950,143 B2 | * | 9/2005 | Ojo et al. ....................... 348/452 |
| 7,667,778 B2 | * | 2/2010 | Yoshiwara ..................... 348/699 |
| 2003/0202605 A1 | * | 10/2003 | Hazra et al. .............. 375/240.26 |
| 2005/0157792 A1 | * | 7/2005 | Baba et al. ............... 375/240.16 |

FOREIGN PATENT DOCUMENTS

| | | |
|---|---|---|
| EP | 0577165 A1 | 1/1994 |
| EP | 0909092 A2 | 4/1999 |
| JP | 06-165134 | 6/1994 |
| JP | 08-130716 | 5/1996 |
| JP | 11-298861 | 10/1999 |
| JP | 2000-134585 | 5/2000 |
| JP | 2004-112229 | 4/2004 |
| JP | 2004-159294 | 6/2004 |
| JP | 2005-006275 | 1/2005 |
| WO | 99/67952 A1 | 12/1999 |
| WO | 01/45036 A1 | 6/2001 |

OTHER PUBLICATIONS

Taiwan Patent Office, OA for TW Application No. 96111801, dated Nov. 2, 2010, 3 pgs.
Summary of Decision of Rejection dated Oct. 11, 2011, issued by the Japanese Patent Office in Application No. 2009-504222 (3 pages).
Summary of Notice of Reasons for Rejection dated Jul. 12, 2011, issued by the Japanese Patent Office in Application No. 2009-504222 (4 pages).

* cited by examiner

*Primary Examiner* — Allen Wong
(74) *Attorney, Agent, or Firm* — Trop, Pruner & Hu, P.C.

(57) ABSTRACT

A system to interpolate between a number of images for the purpose of frame rate conversion may include a motion vector interpolator, a motion compensation module, and a protector. The motion vector interpolator may segment a motion vector into portions based on temporal distances of a target image from each of the number of images. The motion compensation module may generate at least two motion compensated values for a pixel in the target image based on the portions of the motion vector. The protector may choose a motion compensated value for the pixel in the target image when the motion vector is accurate and may choose a pixel value from one of the number of images when the motion vector is not accurate.

9 Claims, 4 Drawing Sheets

MOTION COMPENSATED FRAME RATE CONVERSION WITH PROTECTION AGAINST COMPENSATION ARTIFACTS

BACKGROUND

Implementations of the claimed invention generally may relate to schemes for interpolating between frames of video information and, more particularly, to such schemes that involve motion compensation.

Frame rate conversion, which may also be referred to as temporal rate conversion, scan rate conversion or field rate conversion, may be considered a technique to convert between difference frame rates. A frame rate may be defined as number of frames displayed in a unit of time. Frame rate conversion may be desirable, for example, when exchanging video material internationally. In one particular case, video material in PAL format, which has a frame rate of 50 fields per second, may be desired in NTSC format, which has a frame rate of 60 fields per second. Thus, in order to broadcast video material recorded in PAL format in the United States, which uses NTSC format, frame rate conversion may be needed.

In addition to format conversion, or alternately, frame rate conversion can also be used to enhance perceived quality in video display systems. Differences in display refresh rates may be perceivable to human eyes, and consumers generally prefer a higher refresh rate such as 100 Hz or 120 Hz to the normal frame rate 50/60 Hz supported by broadcasting systems. Frame rate conversion capability in a video display system may enable a user of such system to watch video material at a high frame rate and better perceived quality.

To further introduce the concept of frame rate conversion, an interpolation example will be discussed with regard to FIG. 1. A video sequence 100 may include a temporal sequence of images, or frames, of which an (N−1)th frame 110 and a following Nth frame 130 are shown. A frame rate of sequence 100 may be changed, for example, by inserting an interpolated frame (or "target frame") 120 between frames 110 and 130, with or without dropping existing frames in sequence 100. For example, if an integer multiple of the current frame rate (e.g., double, triple, etc.) is desired, one or more interpolated frames 120 may be inserted roughly equally spaced in time between existing frames 110 and 130. If another frame rate conversion factor is desired, however, interpolated/target frame 120 may be inserted closer in time to one of frames 110 and 130, possibly in conjunction with dropping pre-existing frames in sequence 100.

There are three major types of frame rate conversion schemes available: 1) frame duplicate/drop, 2) temporal interpolation, and 3) motion compensated schemes. The frame duplication/dropping may be the most widely used technique because of its simplicity to implement, but it may also provide the lowest image quality. The motion compensated schemes are generally considered as having the highest image quality, but such schemes also typically entail a high complexity in implementation. As a result of such complexity, motion compensated frame rate conversion schemes may only be available in professional equipment or very high end television or video processors.

Even such complex equipment, however, may still exhibit visual artifacts, such as "halo" artifacts, from inaccuracies in the motion compensation.

BRIEF DESCRIPTION OF THE DRAWINGS

The accompanying drawings, which are incorporated in and constitute a part of this specification, illustrate one or more implementations consistent with the principles of the invention and, together with the description, explain such implementations. The drawings are not necessarily to scale, the emphasis instead being placed upon illustrating the principles of the invention. In the drawings, FIG. 1 conceptually illustrates interpolating between video frames.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of the claimed invention. However, it will be apparent to those skilled in the art having the benefit of the present disclosure that the various aspects of the invention claimed may be practiced in other examples that depart from these specific details. In certain instances, descriptions of well known devices, circuits, and methods are omitted so as not to obscure the description of the present invention with unnecessary detail.

Figure 1:
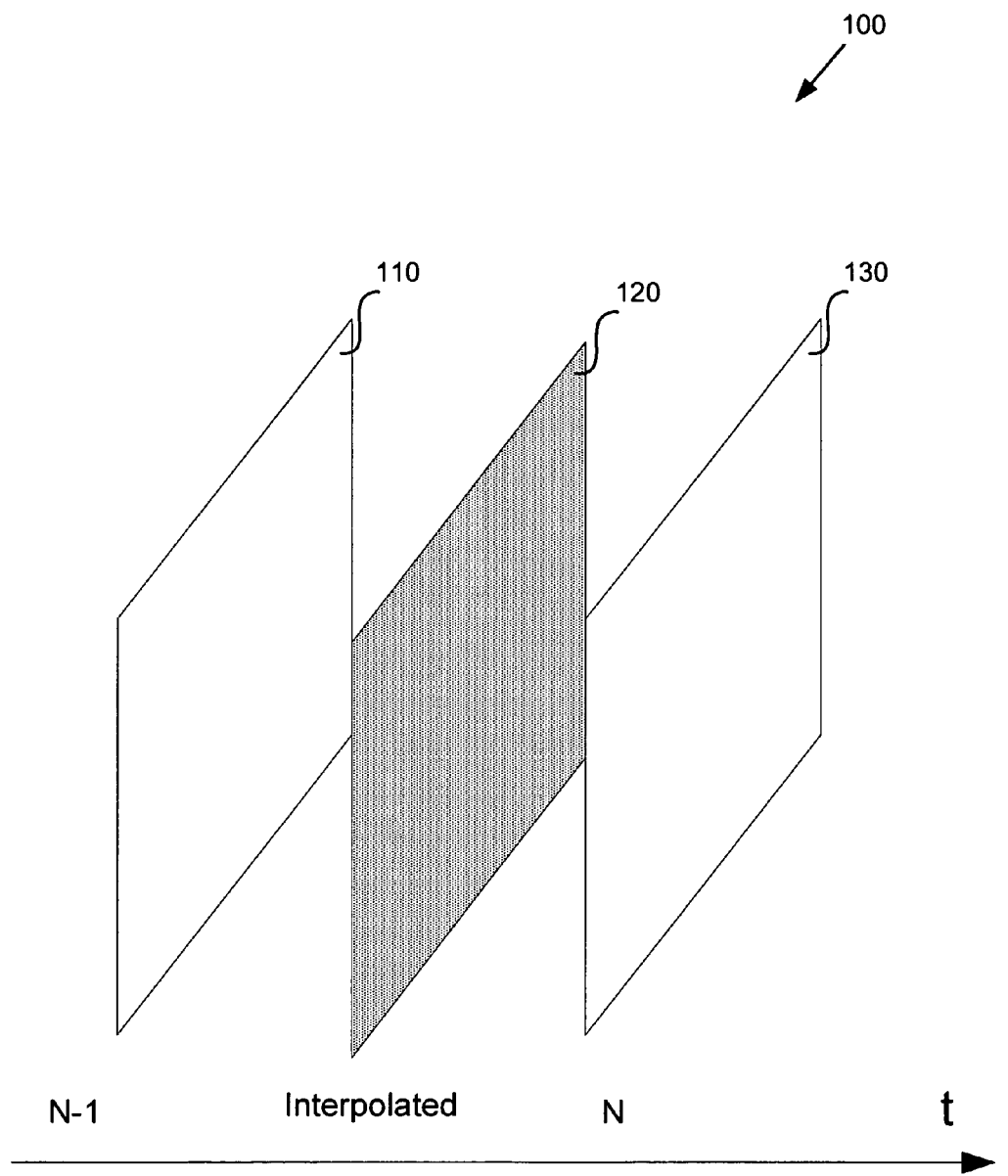
Figure 2:
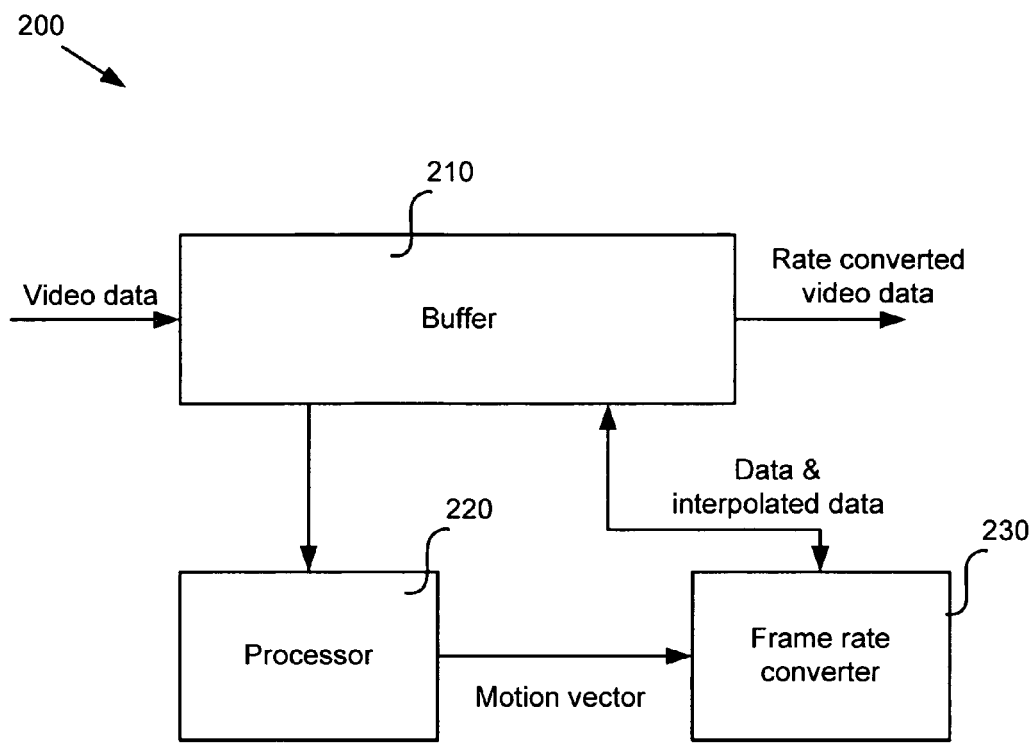
FIG. 2 illustrates a portion of a video display system.

FIG. 2 illustrates a portion of a video display system 200. System 200 may receive video information from any suitable medium, including but not limited to various transmission and/or storage media. An image in the video information may include, for example, luma and chroma values (e.g., Y, U, and V) in its pixels, or values from any other suitable color space. Although illustrated as separate functional elements for ease of explanation, any or all of the elements of system 200 may be co-located and/or implemented by a common group of gates and/or transistors. Further, system 200 may be implemented via software, firmware, hardware, or any suitable combination thereof.

In various implementations, system 200 may include, or be part of, one or more of a processing system, a processing sub-system, a processor, a computer, a device, an encoder, a decoder, a coder/decoder (CODEC), a transformation device, an entertainment system, a display, or any other image processing or display architecture. The implementations are not limited in this context.

The portion of display system 200 shown in FIG. 2 may include a buffer 210, a processor 220, and a frame rate converter 230. The video data input to system 200 may have been previously decoded from any of a number of encoding schemes that may include, but are not limited to, MPEG-1, MPEG-2, MPEG-4, Advanced Video Coding (AVC) (e.g., MPEG-4, part 10 and ITU-T Recommendation H.264), Windows Media Video 9 (WMV-9), and/or SMPTE's VC-1. The video data may be formatted in a television format, such as NTSC or PAL format.

Buffer 210 may be arranged to store frames, or portions of frames, of video data. For example, buffer 210 may store at least a portion of two adjacent frames, or images, in a sequence (e.g., (N−1)th frame 110 and Nth frame 130). Buffer 210 may also be arranged to store at least a portion of an interpolated, or target, frame (e.g., frame 120) when it is generated by frame rate converter 230. Depending on the size of buffer 210, entire frames, a number of lines within a frame, or a number of neighboring pixels may be stored for the existing and interpolated frames. Buffer 210 may also be arranged to output rate converted video data (e.g., frames or portions thereof such as lines or pixels) under the control of processor 220.

Processor 220 may be arranged to control the input and output of video data to/from buffer 210, including interpolated data from frame rate converter 230. Processor 220 may also be arranged to provide motion vectors associated with the frames in buffer 210 to frame rate converter 230. In some implementations, the frames of video data in buffer 210 may arrive with associated motion vectors. In such a case, processor 220 may pass such motion vectors to converter 230.

In some implementations, processor 220 may need to calculate a motion vector $\vec{M}(x, y)$ for pixels in the Nth frame 130. In such a case, processor 220 may calculate the motion vectors using any of a number of known or later-developed motion estimation algorithms, such as that disclosed in U.S. application Ser. No. 11/091,853, filed Mar. 28, 2005, the contents of which are incorporated herein by reference. It should be noted that distinct motion vectors may, in some implementations, be calculated for block of pixels (or a macroblock or some other grouping of pixels). In such implementations, the motion vector would be the same for all pixels within the block or group. In some implementations, however, each pixel may have a unique motion vector associated therewith.

Frame rate converter 230 may be arranged to calculate interpolated pixel values in a target, or interpolated, frame based on motion vectors from processor 220 and on pixel values from the (N−1)th and/or the Nth frames in buffer 210. Upon completing such calculation, converter 230 may be arranged to store such target pixel values in buffer 210, or to output them to another storage device, such as a frame buffer.

Figure 3:
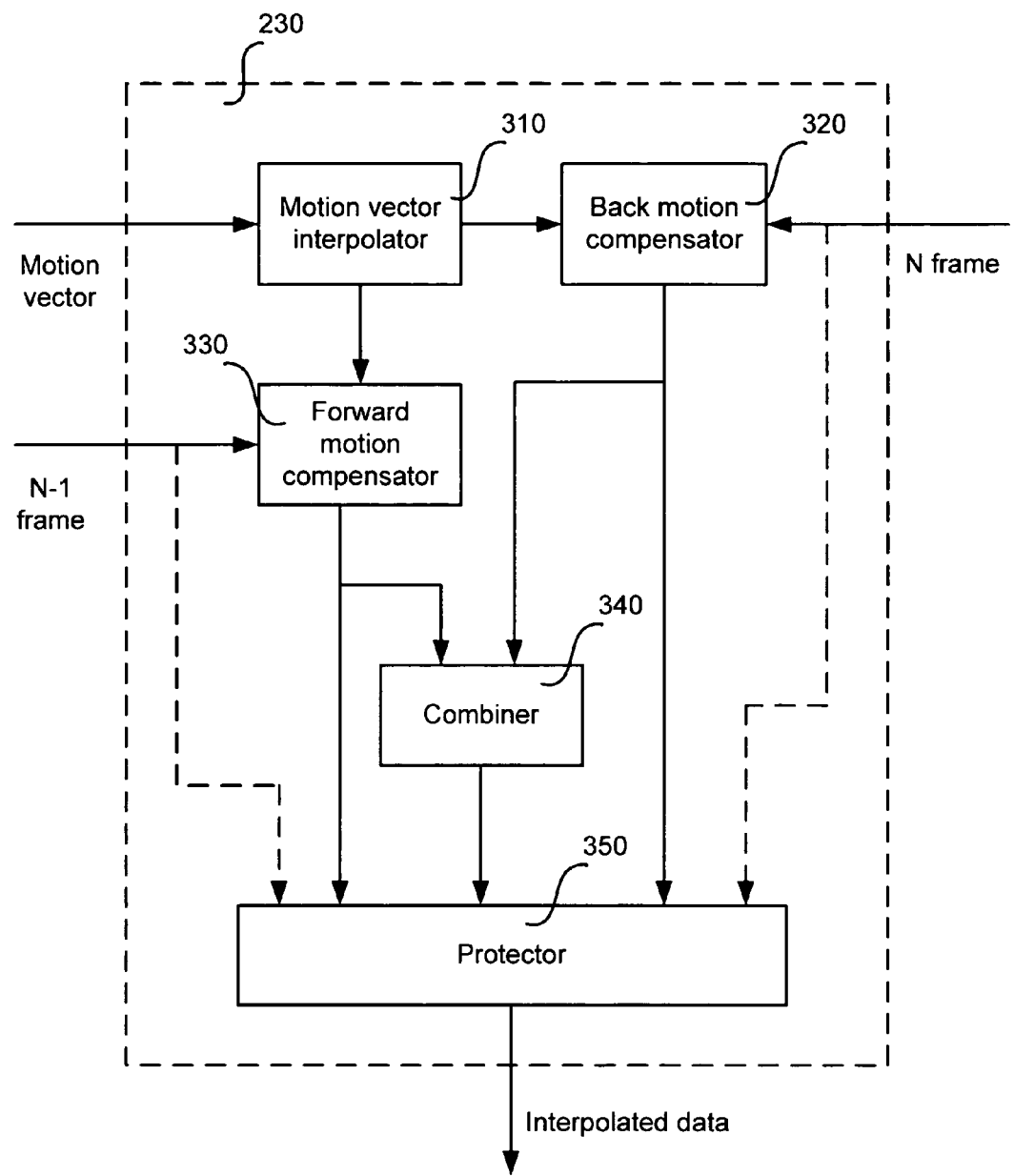
FIG. 3 illustrates an exemplary frame rate converter in the system of FIG. 2.

FIG. 3 illustrates an exemplary implementation of frame rate converter 230. With reference to FIG. 3, the motion vector input to converter 230 may originate from processor 220. Similarly, the N frame and N−1 frame inputs may originate from buffer 210. The interpolated data output from converter 230 also may be sent to buffer 210. In some implementations, converter 230 may generate all color values (e.g., YUV or RGB) associated with an interpolated pixel.

Frame rate converter 230 may include a motion vector interpolator 310, a back motion compensator 320, a forward motion compensator 330, a combiner 340, and a protector 350. These elements 310-350 may be implemented, for example, in logic, gates, transistors, or some other suitable circuit building blocks.

Interpolator 310 may be arranged to interpolate motion vector $\vec{M}(x, y)$ to generate a "forward" motion vector between frame N−1 and the target frame, and a "back" motion vector between frame N and the target frame. For a target frame that is to be temporally halfway between the two original frames, interpolator 310 may calculate the back motion vector between frame N and the target frame as half of $\vec{M}(x, y)$ and may calculate the forward motion vector between frame N−1 and the target frame as also half of $\vec{M}(x, y)$.

For a target frame that is to be temporally closer to one frame than the other, however, interpolator 310 may interpolate motion vector $\vec{M}(x, y)$ differently. For example, for a target frame that is to be ⅓ of the total inter-frame time from frame N−1 and ⅔ of the total time from frame N, the forward motion vector may be one-third of $\vec{M}(x, y)$ and the back motion vector may be two-thirds of $\vec{M}(x, y)$. These two motion vector are then used to compensate pixels from frame N−1 and frame N. In all cases, interpolator 310 may use an appropriate and/or consistent convention for the directions of the forward and back motion vectors.

Back motion compensator 320 may be arranged to calculate a value for a pixel in the target/interpolated frame by motion-compensating a corresponding pixel value from the Nth frame using the back motion vector. This back motion-compensated pixel value may be output to combiner 340 and to protector 350.

Similarly, forward motion compensator 320 may be arranged to calculate another value for a pixel in the target/interpolated frame by motion-compensating a corresponding pixel value from the (N−1)th frame using the forward motion vector. This forward motion-compensated pixel value may be output to combiner 340 and to protector 350.

Combiner 340 may be arranged to combine the back motion-compensated pixel value and the forward motion-compensated pixel value to produce a combined motion-compensated pixel value. In implementations where the target frame is equidistant from the Nth and (N−1)th frames, combiner 340 may calculate the combined motion-compensated pixel value as the mean of the two input values. In implementations where target frame is not equidistant from the Nth and (N−1)th frames, however, combiner 340 may calculate the combined motion-compensated pixel value as a weighted average of the two input values based on the target frame's respective temporal distance from the other frames. This combined motion-compensated pixel value may also be output to protector 350.

The dotted lines from the N frame data and the N−1 frame data in FIG. 3 to protector 350 indicate additional pixel values from the closer frame (i.e., N or N−1) to the target frame. For example, in some implementations where the target frame is equidistant or temporally closer to frame N, protector 350 may receive a number of pixel values from frame N that are adjacent the (x, y) position of the interpolated/target pixel in frame N. In such implementations, no pixel values from frame N−1 may be received by protector 350. In some implementations where the target frame is temporally closer to frame N−1, protector 350 may receive a number of pixel values from frame N−1 that are adjacent the (x, y) position of the interpolated/target pixel in frame N. In such implementations, no pixel values from frame N may be received by protector 350.

Protector 350 may be arranged to choose a "central" value for the interpolated/target pixel in question based on the motion-compensated values (and possibly combinations thereof) and values of pixels in another frame (e.g., frame N) that are spatially close to the position of the target pixel. For example, in one implementation, protector 350 may include a five-tap median filter. The inputs to such median filter 350 are, in such implementation: (1) a back motion-compensated pixel value from frame N via compensator 320; (2) a forward motion-compensated pixel value from frame N−1 via compensator 330; (3) the average of the back motion-compensated pixel value and the forward motion-compensated pixel value from combiner 340; (4) the value of a pixel in frame N one line above the (x, y) position of the interpolated pixel; and (5) the value of a pixel in frame N one line below the (x, y) position of the interpolated pixel. Protector 350 may output the median of these five values as the value of the interpolated pixel.

In such an implementation, the median filter 350 will tend to select the average value if the motion vector, from which the motion-compensated values are determined, is reasonably accurate. If the motion vector was not accurately calculated, however, median filter 350 will tend to select one of the spatially "close" pixel values from frame N. Although this spatial selection by protector 350 may provide more blurring relative to good motion compensation, it may "protect" against artifacts (e.g., split pixels moving at different speeds and/or halo-ing) caused by inaccurate motion compensation.

It should be noted that protector 350 need not be a median filter; nor need it necessarily have five inputs. Rather, protector 350 may include any device that chooses a central value among motion-compensated values and non-motion-compensated (i.e., spatially-close in another frame) values. For example, protector 350 may disregard one or more outlier values and may compute the value of the interpolated pixel, as the mean or some other statistical measure of the remaining values. Although in some implementations, the output of combiner 340 may bias protector 350 toward selecting a motion-compensated value when the motion vector is accurate or well behaved, in some implementations the number of motion-compensated input values to protector 350 need not exceed the number of spatially close input values. Variations in the type of filtering, the number of inputs, and/or the types of inputs are both possible and contemplated.

Figure 4:
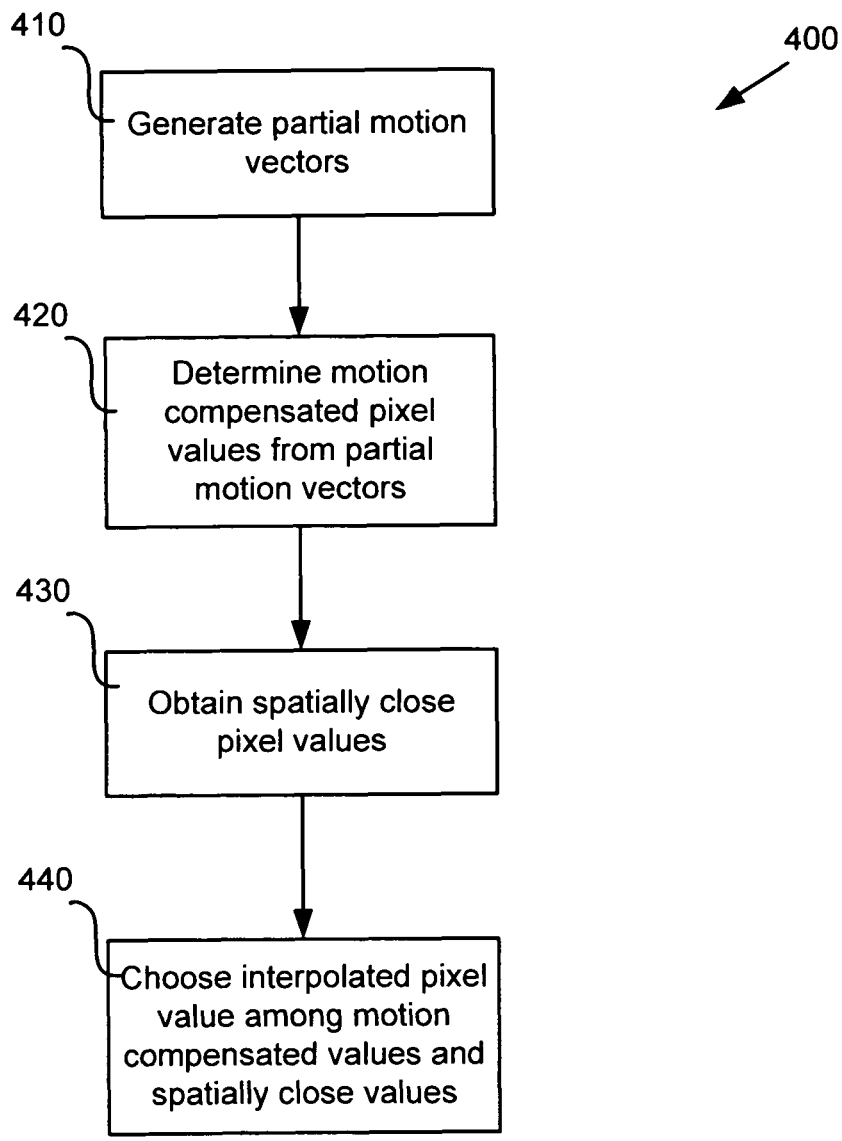
FIG. 4 illustrates an exemplary process of determining an interpolated pixel value during frame rate conversion.

FIG. 4 illustrates an example process 400 of determining an interpolated pixel value during frame rate conversion. Although FIG. 4 may be described with regard to frame rate converter 230 described in FIGS. 2 and 3 for ease and clarity of explanation, it should be understood that process 400 may be performed by other hardware and/or software implementations.

Processing may begin by motion vector interpolator 310 generating partial motion vectors to a pixel in the target frame [act 410]. Such generation may be from a motion vector between two or more frames surrounding the target/interpolated frame. Although in the previous examples, the partial motion vectors were determined from two frames, N and N−1, such may in some implementations be generated from three or more currently-existing frames or portions thereof.

Processing may continue by compensator 320 and/or 330 determining motion-compensated pixel value(s) from the partial motion vectors generated in act 410 [act 420]. Act 420 may optionally include combining two or more motion-compensated pixel values to form another combined, motion-compensated value.

Protector 350 may also receive one or more pixel values from one of the frames surrounding the target/interpolated frame (e.g., the Nth frame) that is spatially close to the identical location of the interpolated pixel, but within the one frame [act 430]. For example, such values may include one or more pixels in the Nth frame, for example, that are above, below, to the left of, or to the right of the pixel in the Nth frame at the (x, y) location where the target pixel resides in the target frame.

Processing may continue with protector 350 choosing an interpolated pixel value from among the motion compensated values generated in act 420 and the spatially close pixel values obtained in act 430 [act 440]. In some implementations, protector 350 may choose a median value out of several possible values. In some implementations, act 440 may involve another "central" choosing operation other than the median. Act 440 may have the effect of protecting against motion-related artifacts when the motion vectors generated in act 410 are not, for whatever reason, accurate. When these vectors are accurate, however, the motion-compensated values may be relatively close to each other (and to their average when present), and act 440 may choose the motion-compensated pixel value(s) for the target/interpolated frame.

Acts 410-440 may be repeated until interpolated values are chosen for all pixels in the target frame or image. Although not explicitly shown in FIG. 4, process 400 may also include generating motion vectors before act 410 when needed. It may also include sending the target pixel values to buffer and sending out rate-converted video data when there are sufficient target values to do so.

The foregoing description of one or more implementations provides illustration and description, but is not intended to be exhaustive or to limit the scope of the invention to the precise form disclosed. Modifications and variations are possible in light of the above teachings or may be acquired from practice of various implementations of the invention.

For example, although the scheme described herein may be performed on a pixel-by-pixel basis, it may also be performed for aggregations or groups of pixels in an image. Also, the scheme described herein should not be limited to the specific implementations disclosed (e.g., two-frame, interpolated motion compensation), but rather may apply to any technique that protects against motion-induced artifacts by choosing a spatially-close pixel in one of the original frames when the motion-compensated values deviate too greatly from the spatially-close values. The claimed invention is intended to encompass any such technique that protects against such motion-related artifacts in motion-compensated frame rate conversion.

Further, at least some of the acts in FIG. 4 may be implemented as instructions, or groups of instructions, implemented in a machine-readable medium.

No element, act, or instruction used in the description of the present application should be construed as critical or essential to the invention unless explicitly described as such. Also, as used herein, the article "a" is intended to include one or more items. Variations and modifications may be made to the above-described implementation(s) of the claimed invention without departing substantially from the spirit and principles of the invention. All such modifications and variations are intended to be included herein within the scope of this disclosure and protected by the following claims.

What is claimed is:

1. A system to interpolate between a plurality of images, comprising:

a motion vector interpolator to generate an interpolated frame based on a central value derived from motion compensated values from temporally displaced frames and from spatially displaced non-motion compensated pixels in said temporally displaced frames including a first pixel in one of said displaced frames displaced in a first spatial direction and a second pixel in the other of said displaced frames in a second spatial direction opposite to said first direction; and a memory coupled to said interpolator.

2. The system of claim 1 including:

a motion compensation module to generate at least two motion compensated values for a pixel in the target image based on a motion vector; and a protector to choose a motion compensated value for the pixel in the target image when the motion vector is accurate and to choose a pixel value from one of the plurality of images when the motion vector is not accurate.

3. The system of claim 2, further comprising:

a combiner to statistically combine the at least two motion compensated values and to output a combined motion compensated value to the protector.

4. The system of claim 2, wherein the motion compensation module includes:
- a forward motion compensation module to generate a forward motion compensated value for the pixel in the target image based on a first portion of the motion vector and an earlier image of the plurality of images, and
- a back motion compensation module to generate a back motion compensated value for the pixel in the target image based on a second portion of the motion vector and a later image of the plurality of images.

5. The system of claim 2, wherein the protector includes:
- a median filter arranged to choose a median among the at least two motion compensated values and at least two pixel values from one of the plurality of images to output as an interpolated value for the pixel in the target image.

6. The system of claim 2, further comprising:
- a buffer to store at least a portion of the plurality of images and the target image.

7. The system of claim 2, further comprising:
- a processor to calculate the motion vector based on the plurality of images and to output the motion vector to the motion vector interpolator.

8. The system of claim 1, said motion vector interpolator to generate an interpolated frame based on a central value constituting an average value.

9. The system of claim 1, said motion vector interpolator to generate an interpolated frame from spatially displaced non-motion compensated pixels in one of said temporally displaced frames wherein said spatially displaced pixels are obtained from a line above the interpolated pixel and a line below the interpolated pixel.

* * * * *

UNITED STATES PATENT AND TRADEMARK OFFICE
CERTIFICATE OF CORRECTION

PATENT NO. : 8,472,524 B2
APPLICATION NO. : 11/397041
DATED : June 25, 2013
INVENTOR(S) : Tiehan Lu Page 1 of 1

It is certified that error appears in the above-identified patent and that said Letters Patent is hereby corrected as shown below:

In the Claims
Column 6, line 46:
"central" should be deleted.

Signed and Sealed this
Thirtieth Day of July, 2013

Teresa Stanek Rea
*Acting Director of the United States Patent and Trademark Office*